Sept. 24, 1963     C. A. TEICHERT     3,104,530
ACCESSORY DRIVE MECHANISM

Filed Oct. 19, 1961                       6 Sheets-Sheet 1

INVENTOR.
Conrad A. Teichert
BY
R. L. Spencer
ATTORNEY

Sept. 24, 1963 C. A. TEICHERT 3,104,530
ACCESSORY DRIVE MECHANISM
Filed Oct. 19, 1961 6 Sheets-Sheet 2
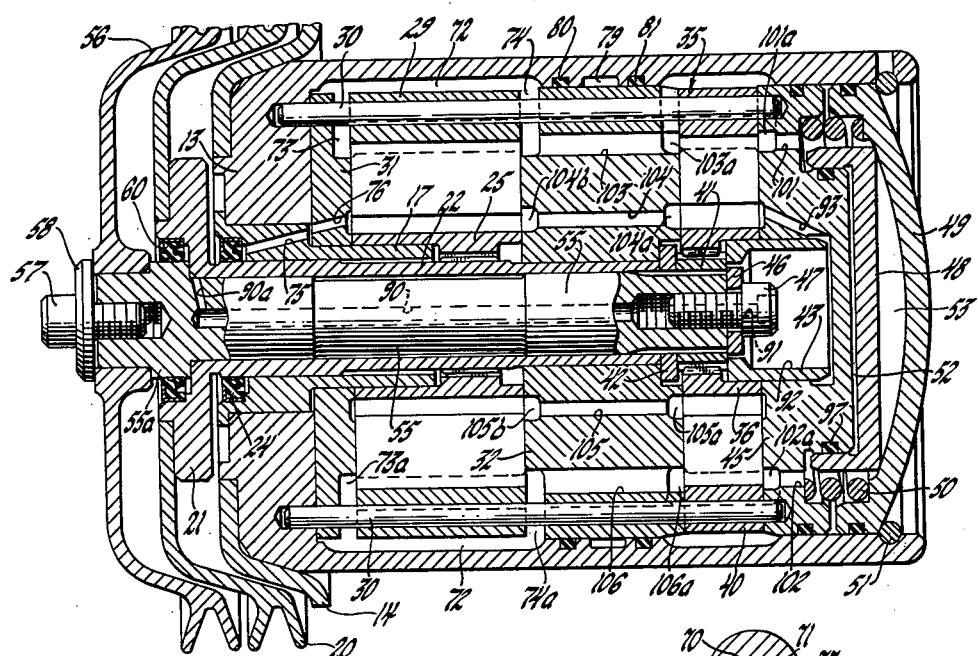
INVENTOR.
Conrad A. Teichert
BY
R. L. Spencer
ATTORNEY

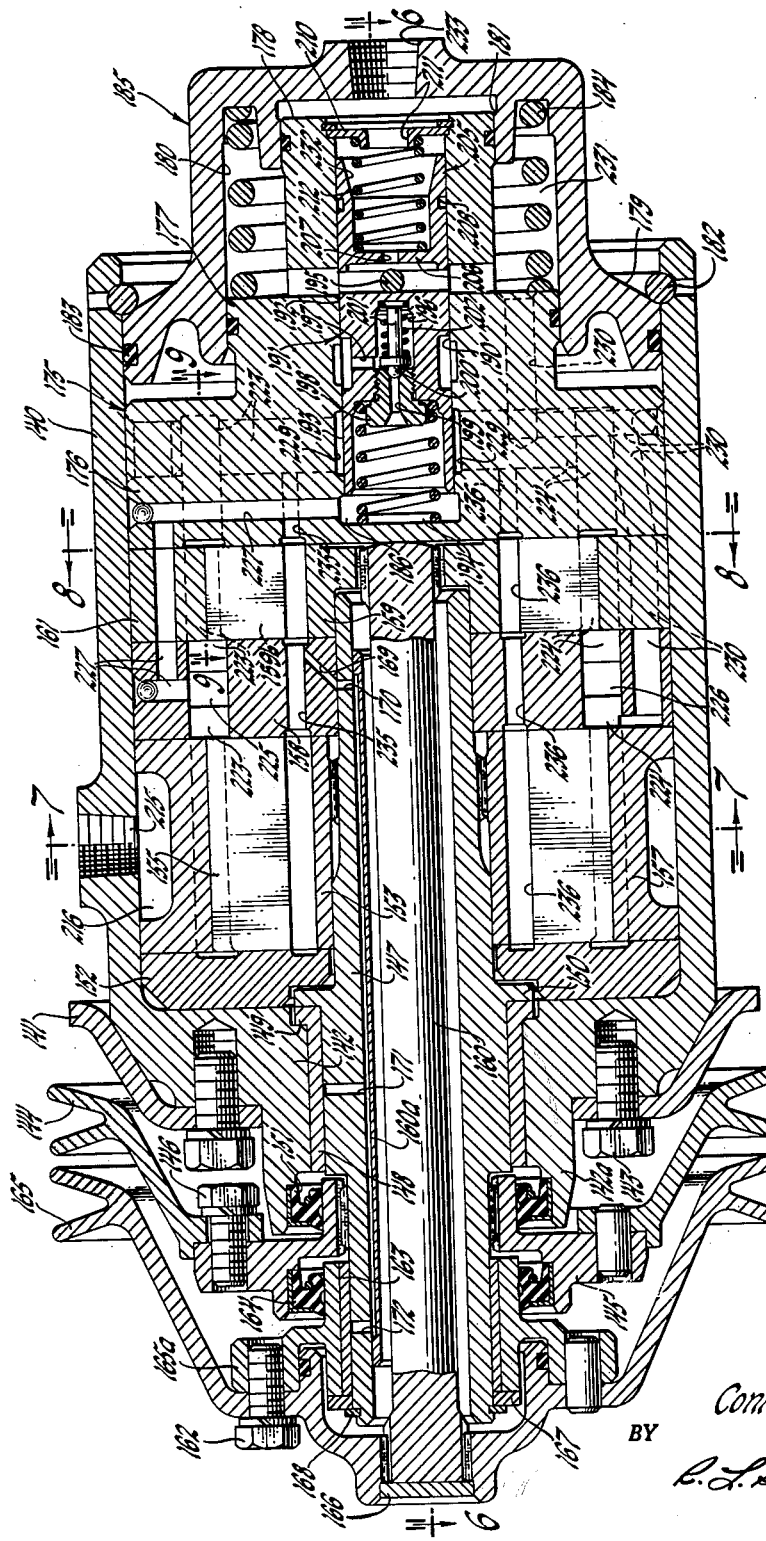

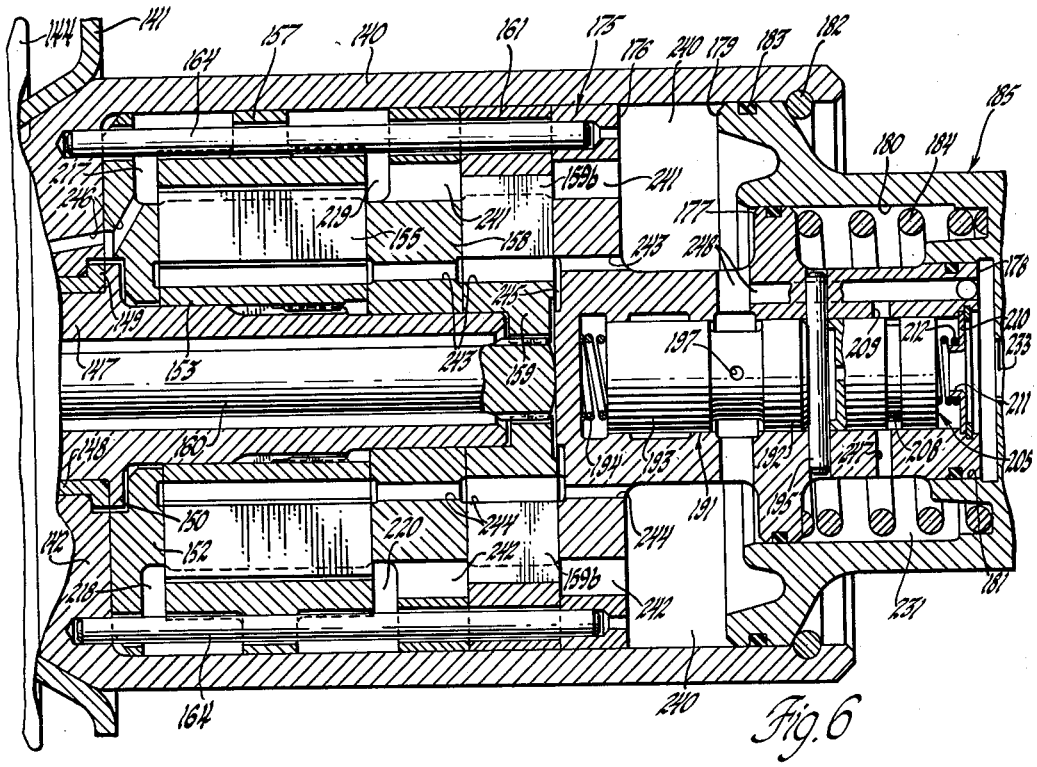
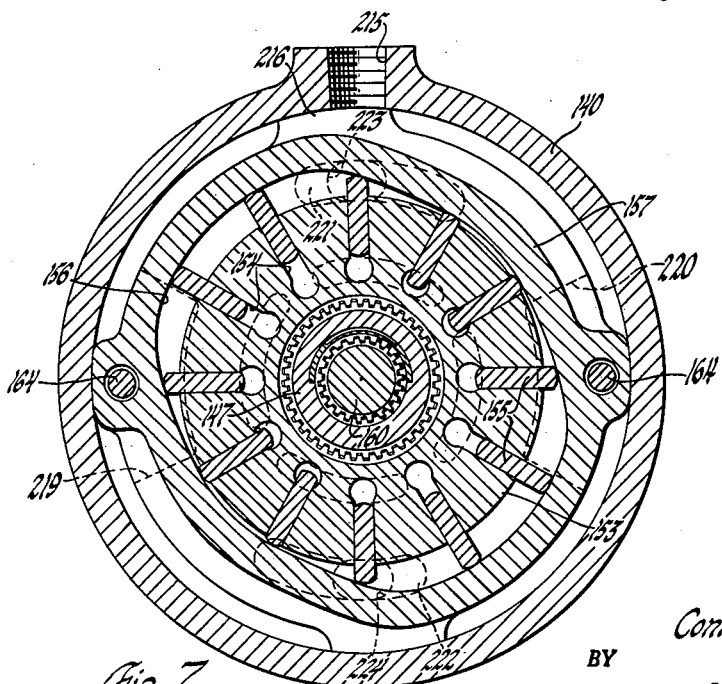

Sept. 24, 1963    C. A. TEICHERT    3,104,530
ACCESSORY DRIVE MECHANISM
Filed Oct. 19, 1961    6 Sheets-Sheet 5

INVENTOR.
Conrad A. Teichert
BY
R. L. Spencer
ATTORNEY

Sept. 24, 1963  C. A. TEICHERT  3,104,530
ACCESSORY DRIVE MECHANISM
Filed Oct. 19, 1961  6 Sheets-Sheet 6

INVENTOR.
Conrad A. Teichert
BY
R. L. Spencer
ATTORNEY

United States Patent Office 3,104,530
Patented Sept. 24, 1963

3,104,530
ACCESSORY DRIVE MECHANISM
Conrad A. Teichert, Grand Rapids, Mich., assignor to General Motors Corporation, Detroit, Mich., a corporation of Delaware
Filed Oct. 19, 1961, Ser. No. 146,217
18 Claims. (Cl. 60—53)

This invention relates to accessory drive mechanism for driving the accessories of an automotive vehicle and more particularly to an automatically controlled accessory drive assembly incorporating a common pump for supplying fluid to an accessory drive motor which continuously utilizes fluid for driving some accessories and for simultaneously supplying fluid under pressure to devices which only utilize fluid in an intermittent manner.

In automotive vehicles, various variable speed drive arrangements have heretofore been proposed for driving the engine accessories. It is believed to be new in the art to provide a variable speed accessory drive assembly wherein a single engine driven pump supplies fluid under pressure both to an accessory drive motor for continuous motor operation and to other vehicle accessories which only intermittently utilize fluid under pressure for their operation, such as, for example, power steering mechanism.

It is well known that savings in fuel consumption, accessory noise, accessory wear may be had by varying the accessory speed with respect to engine speed. In the present invention, control valving automatically operates to regulate the speed of an accessory drive hydraulic motor relative to the speed of an engine driven pump in such manner that in a first low speed range of the motor and pump the motor speed increases directly with increase in engine and pump speed; in a second engine and pump speed range the accessory drive motor speed decreases rapidly relative to pump and engine speed; and in a third speed range of the engine and pump the motor speed increases slowly relative to pump and engine speed with increases in engine and pump speed. In the first low engine-pump speed range the motor is driven at speeds substantially higher than pump and engine speed, for example, twice engine-pump speed; in the second intermediate engine-pump speed range the motor speed drops rapidly to a speed less than engine and pump speed, for example 75% of engine-pump speed; and in the third engine-pump speed range the motor speed will increase slowly with respect to engine-pump speed but will remain less than engine-pump speed, for example, 85% of engine-pump speed.

The engine driven pump and accessory drive motor and control valving are assembled into a compact assembly in a common housing and are hydraulically connected by internal passages within the housing for efficient performance and for maximum safety against external fluid leakage. A minimum of external oil seals are required and such seals are hydraulically connected to pump suction to further minimize the possibility of external oil leakage.

In the control of the speed of an accessory drive motor a flow control orifice and a by-pass valve positioned between the pump and motor are arranged such that the by-pass valve is acted upon by pump discharge pressure on the upstream side of the flow control orifice tending to move the by-pass valve to a fluid by-pass position and is acted upon by spring means and fluid pressure on the downstream side of the flow control orifice tending to move the by-pass valve to a position wherein by-pass of fluid from the pump discharge to pump suction is prevented. In one arrangement the fluid acting on the valve and tending to position the by-pass valve to prevent by-pass of pump discharge pressure is taken off at the supply to the motor. In another embodiment it is taken off at the point of maximum velocity, minimum pressure directly from the flow control orifice. A power steering compensator valve is furnished to compensate for flow of fluid to the power steering unit at low engine and pump speeds such as idle. Internal passages are provided within the housing both from the pump to the motor and from the motor to the pump for efficient operation. Fluid delivery passages from the pump to the power steering unit and from the power steering unit to the pump are provided in the pump motor housing and may be connected to the power steering unit by conventional flexible hose. Particular structure is provided whereby the pump and motor rotors are physically supported for rotation and the pump and rotor cam rings are held in a fixed position with respect to their individual rotors for quiet operation of the pump and motor. The pump and motor are arranged in tandem in the housing and separated by a separator plate. The pump, separator plate and motor are spring biased by a heavy spring against a thrust plate and by pump discharge pressure against the thrust plate to prevent internal leakage in the pump and motor.

These and other advantages of this invention will be apparent from the following description and claims, taken in conjunction with the accompanying drawings in which:

FIGURE 2 is a sectional view of the pump taken along the line 2—2 of FIGURE 1.

FIGURE 3 is a sectional view of the accessory drive assembly taken along the line 3—3 of FIGURE 1.

FIGURE 4 is a sectional view through the motor taken along the line 4—4 of FIGURE 1.

FIGURE 5 is a longitudinal sectional view through a second embodiment of a pump, motor and control valve assembly.

FIGURE 6 is a sectional view taken along the line 6—6 of FIGURE 5.

FIGURE 7 is a sectional view through the pump taken along the line 7—7 of FIGURE 5.

Figure 1:
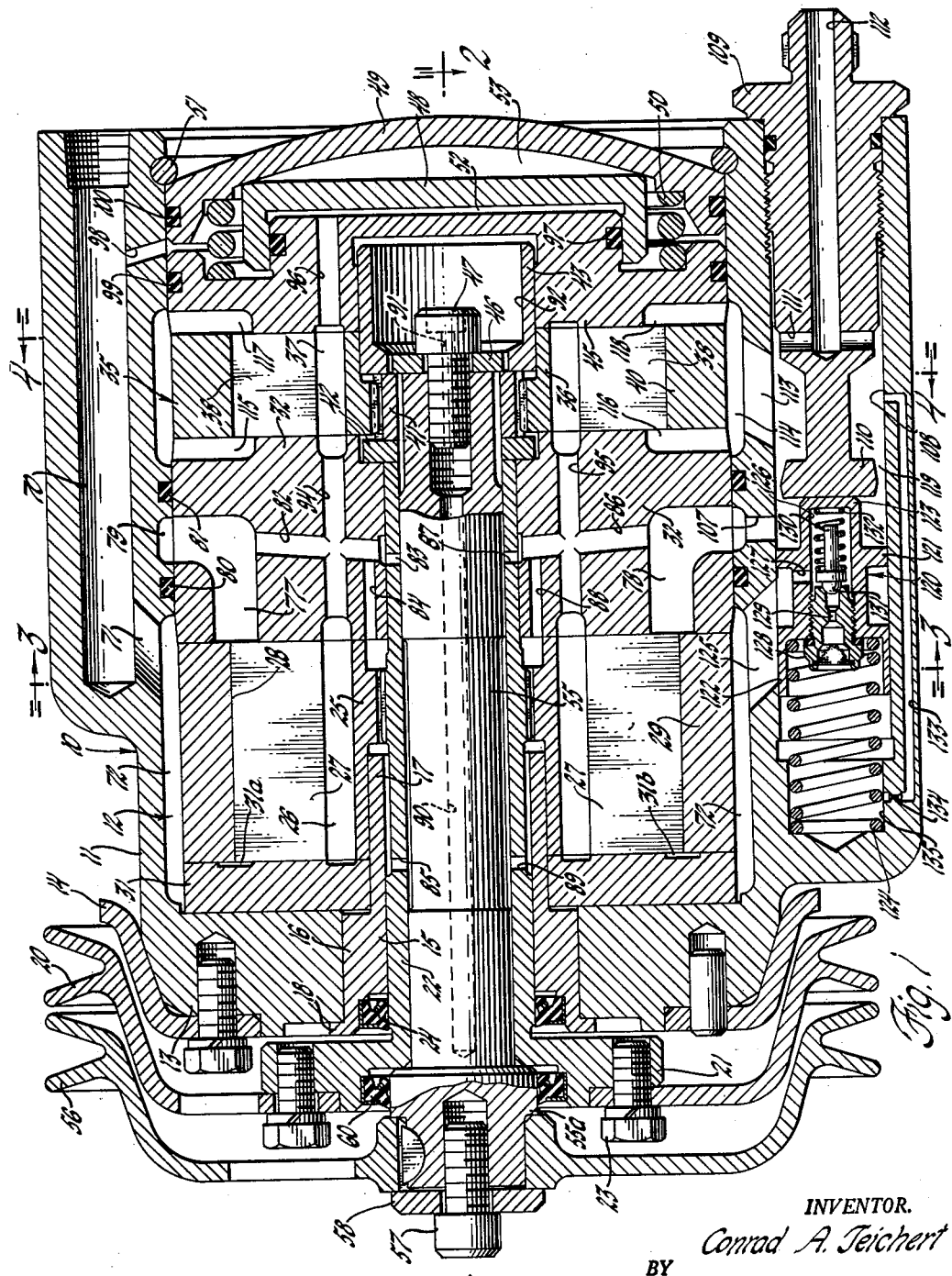
FIGURE 1 is a longitudinal section through a hydraulic accessory drive constructed in accordance with the principles of this assembly.
Figure 8:
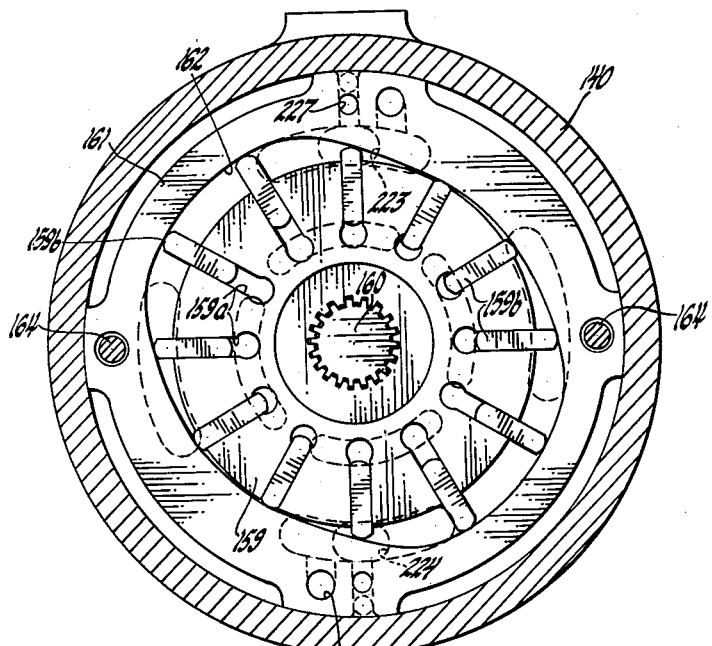
FIGURE 8 is a sectional view taken along the line 8—8 of FIGURE 5.

Referring to FIGURE 1 there is shown an accessory drive and power steering pump pressure supply unit incorporating a pump and motor assembly wherein a single pump supplies fluid under pressure to an accessory drive motor and for power steering functions. The self-contained unit assembly generally indicated at 10 is particularly adapted for use in automotive vehicles wherein it may readily be mounted at any selected location in the vehicle due to its compact size and due to the fact that the assembly constitutes a self-contained unit.

A cylindrical housing 11 forms a cylindrical chamber 12 which is open at its right-hand end as viewed in FIGURE 1 and partially closed off at its opposite end by an end wall 13 formed integrally with housing 11. A mounting bracket 14 may be bolted to the external surface of end wall 13 to support the unit on a vehicle (not shown). A rotor alignment sleeve 15 has a bearing portion 16 in concentric relation to end wall 13, a reduced diameter sleeve portion 17 extending into chamber 12, and an outwardly flanged lip 18 contacting the external surface of end wall 13. In the assembly the enlarged bearing portion 16 contacts the inner circumference of end wall 13 and is coextensive with the width or thickness of end wall 13, the fit preferably being a pressed fit. The reduced diameter sleeve support portion 17 is thereby accurately disposed to extend axially into chamber 12 with the longitudinal axis of sleeve 17 in alignment with the longitudinal axis of chamber 12. Lip 18 by contacting the external surface of end wall 13 functions as a stop member whereby sleeve 17 is automatically assembled to extend into chamber 12 to the proper depth and also cooperates with the external surface of end wall 13 to prevent any wobble or deviation of sleeve 17 under operating conditions. The mounting of sleeve 15, and portion 17 in end wall 13 is rigid.

A power input pulley 20 is fixed to an upstanding flange 21 of a power input sleeve shaft 22 by bolts 23, shaft 22 extending through rotor alignment sleeve 15–17 and being rotatably supported therein. An oil seal 24 is disposed between input shaft 22 and sleeve 15 to prevent leakage of oil from chamber 12. A vane pump rotor 25 is driven by shaft 22. Sleeve 17 rotatably supports shaft 22, the shaft 22 extending through sleeve 17, and also supports rotor 25 on its external surface, the external surface of sleeve 17 extending into rotor 25 and providing a support for the rotor. Sleeve 17 extends through a thrust plate 31 disposed between one end of pump rotor 25, the internal surface of end wall 13 in chamber 12.

As best shown in FIGURE 3, pump rotor 25 is provided with twelve vane slots 26 equally spaced in the rotor, there being a vane 27 in each of the slots. Vanes 27 extend outwardly from slots 26 into contact with the cam surface 28 of a cam ring 29. Cam ring 29 and thrust plate 31 are fixed against rotation by means of dowel pins 30 best shown in FIGURE 2, the pins 30 extending through suitable pin receiving openings in cam ring 29, thrust plate 31 and into end wall 13. The arrangement whereby sleeve 17 supports rotor 25 adjacent the spline connection of the rotor to input sleeve shaft 22 assures that rotor 25 will rotate without wobble and in a concentric manner with respect to cam ring 29. The bearing alignment sleeve 17 provides a bearing surface between the thrust plate 31 and rotor 25. Cam ring 29 and thrust plate 31 are each pinned to end wall 13. The fit between sleeve 17, thrust plate 31 and pump rotor 25 is a bushing fit and the thrust plate and cam ring 29 are doweled together and to end wall 13. Concentric rotation of pump rotor 25 with respect to cam ring 29 is thus assured for noise-free operation.

Power input shaft 22 extends axially inwardly into chamber 12 beyond pump rotor 25 into a running bushing fit with a separator plate 32, the plate 32 being held against rotation by means of dowel pins 30. Separator plate 32 functions to separate the hydraulic pump section of the assembly from the motor section, serves as a thrust plate for both the pump and motor, provides oil distribution passages, and supports the inner end of input shaft 22 for rotation therein.

A hydraulic vane type motor indicated generally at 35 and best shown in FIGURE 4 is disposed in chamber 12 at the side of separator plate 32 opposite the pump. Motor 35 includes a motor vane rotor 36 having twelve equally spaced slots 37 formed therein, each slot containing a motor vane 38 extending radially outwardly into a cam surface 39 of a motor cam ring 40. Rotor 36 is connected to drive a power delivery shaft 55 by means of a ring spacer 41 disposed between motor rotor 36 and shaft 55 and splined to the hub and shaft. A thrust washer 42 is disposed between the end of input shaft 22 and one end of spacer 41, the washer extending radially outwardly into an annular recess in separator plate 32. Motor rotor 36 is supported adjacent its connection with spacer 41 by means of a rotor alignment sleeve 43 carried by a presser plate 45. A washer 46 bolted to the end of output shaft 55 by a bolt 47 bears against the end of spacer 41 to retain output shaft 55 in the assembly. An enlarged end 55a on shaft 55 overlies the outer end of shaft 22 to retain the input shaft in the assembly. Presser plate 45 is spring-biased into contact with one side of motor cam ring 40 by a spring 50 seated upon a cover 49. An inner end plate or cover 48 is disposed between presser plate 45 and end pltae 49. A snap ring 51 retains cover 49 in the assembly. Motor cam ring 40 and presser plate 45 are held against rotation by dowel pins 30 as best shown in FIGURE 2. As hereafter more particularly explained, a chamber 52 between presser plate 45 and cover 48 is supplied with pump discharge pressure and a chamber 53 between cover 48 and cover 49 is continuously connected to pump suction. Rotor alignment sleeve 43 extends into motor rotor 36 to support it, the sleeve being closely fitted in presser plate 45. Motor cam ring 40 is held in fixed position with respect to presser plate 45 by dowel pins 30. It will be understood that both motor hub 36 and cam ring 40 are thereby retained in fixed relationship with respect to each other so that the hub rotates in a concentric relation with respect to the cam ring for minimum noise performance. The reduction in noise and quiet operation of the pump and motor is particularly important in installations in automotive vehicles.

Power delivery shaft 55 is rotatably supported in power input shaft 22 and drives a pulley 56 keyed thereto and fastened thereon by means of a bolt 57 and a washer 58. An oil seal 60 is disposed between a recess in flange 21 of shaft 22 and the enlarged diameter portion 55a of shaft 55.

*Fluid Circuits*

Considering the fluid circuits of the pump and motor, a passage 70 in housing 11 receives return oil from a power steering valve, or reservoir, the pump suction oil being connected to an annular chamber 72 extending around the periphery of pump cam ring 29 by means of a passage 71 in housing 11. Suction oil from chamber 72 is admitted to the pump vanes through a pair of diametrically opposed arcuate shaped recesses 73, 73a formed in thrust plate 31 and through a pair of diametrically opposed arcuate shaped recesses 74, 74a formed in separator plate 32. Thus, the pump is supplied with low pressure or suction fluid axially from each side of the pump and from opposite sides of its axis of rotation from a common annular fluid supply chamber extending around the periphery of cam ring 29. This arrangement of fluid supply assures hydraulic balance of the rotating parts and smooth flow of oil to the pump, contributing to quiet and smooth pumping action. Oil seal 24 is connected to the low pressure area of the pump chamber by means of an oil return passage 75 in alignment sleeve 15 and a passage 76 in thrust plate 31. Thus, any pump or high pressure discharge oil which may travel to oil seal 24 will be returned to pump suction, thereby minimizing oil leakage through seal 24. Assuming a clockwise rotation of the pump as viewed in FIGURE 3, oil under pressure will be discharged from the pump vanes to a pair of arcuate shaped pump delivery passages 77 and 78 formed in separator plate 32, the passages in plate 32 extending axially and then radially outwardly to terminate in an annular high pressure pump discharge channel 79 (see FIG. 1) formed in housing 11. While pump discharge fluid is discharged axially only from one side of the pump, the pump is balanced radially by means of the two pump discharge passages located at opposite sides of the axis of rotation of the pump. Arcuate shaped relief areas 31a and 31b are formed in thrust plate 31, being similar in location and area to pump delivery passages 77 and 78, provide complete axial hydraulic balance of the pump rotor. A pair of O-ring seals 80 and 81 between housing 11 and separator plate 32 at opposite sides of annular channel 79 prevent leakage of high pressure pump discharge fluid in an axial direction. Pump discharge fluid is conducted through passages 82 and 86 in separator plate 32 to ports 83 and 87, respectively, in power input shaft 22 to lubricate the bearing surface between shaft 22 and output shaft 55. Axially extending passages 84 and 88 in separator plate 32 conduct pump discharge pressure to the space between rotor 25 and power input shaft 22. Ports 85 and 89 in shaft 22 admit high pressure oil to the space between shafts 22 and 55 for lubrication. As heretofore explained, high pressure oil is returned from seal 24 to pump suction through passages 75 and 76. There will therefore be a continuous flow of oil for lubrication and cooling purposes without excessive pressure build-up upon seal 24. In like manner, high pressure oil admitted through ports 83, 87, 85 and 89 to the bearing surface between shafts 22 and 55 will travel axially to an oil seal 60 between shafts 22 and 55 from which it is returned to pump suction through a passage 90a—90 in shaft 55, a passage 91 through bolt 47, a chamber 92, a passage 93 in presser plate 45, and additional oil return passages hereafter more fully described.

High pump pressure passages 82 and 86 connect to axially extending passages 94 and 95, respectively, formed in separator plate 32 to conduct pump discharge pressure to the pump vane slots 26 and motor vane slots 37 to force the pump and motor vanes radially outwardly into contact with their respective cam rings both by centrifugal force and by pump discharge pressure to prevent vane clatter and to increase the efficiency of the pump and motor. As further shown in FIGURE 1, pump discharge pressure is conducted axially through a passage 96 in presser plate 45 to chamber 52 between the end of presser plate 45 and cover 48. An O-ring seal 97 between presser plate 45 and cover 48 prevents leakage of high pressure fluid from chamber 52 to chamber 53. Chamber 53 between covers 48 and 49 is continuously connected to passage 70 through a passage 98 in housing 11. A pair of oil seals 99 and 100 prevent oil leakage between presser plate 45 and housing 11 and between cover 49 and housing 11. A spring 50 seated upon cover 49 and high pressure pump discharge pressure in chamber 52 combine to apply an axial thrust to the assembly so that internal leakage in the pump and motor is prevented, further contributing to the quiet and efficient operation of the motor. It is further to be noted that all of the external or end oil seals 24, 60 and 100 are connected to pump suction. This minimizes any possibility of high oil pressure build-up on the seals and possible seal failure. Any oil which may possibly leak from chamber 52 to chamber 53, and past seal 99, will simply be returned to the pump with no external leakage past seal 100.

Referring further to FIGURE 2, the motor discharge fluid which is at low pressure is connected to chamber 53 through passages 101 and 102 in presser plate 45, the passages 101 and 102 connecting to arcuate shaped pressure discharge passages 101a and 102a, respectively, formed in presser plate 45. Fluid from the motor is also returned to pump suction through passages 103, 104, 105 and 106 formed in separator plate 32, the passages terminating in arcuate shaped passages 103a, 74, 104a, 104b, 105a, 105b, and 106a, 74a, respectively in separator plate 32.

As best shown in FIGURE 1, high pressure pump discharge is conducted from annular channel 79 in housing 11 through a discharge passage 107 to a valve bore 108 in housing 11. A plug 109 screw threaded into bore 108 has a land 110 thereon of lesser diameter than bore 108 and pressure delivery passages 111—112 therein. Valve bore 108 delivers pressure to an annular recess 114 extending entirely around the periphery of motor cam ring 40 through a passage 113 in housing 11. A pair of arcuate shaped recesses 115 and 116 formed in separator plate 32 admit high pressure fluid to one side of the motor vanes. A pair of arcuate shaped recesses 117 and 118 formed in presser plate 45 admit high pressure fluid from annular chamber 114 to the opposite side of the motor vanes. The motor is thereby supplied with high pressure fluid from both sides of the vanes. Land 110, being of lesser diameter than valve bore 108 forms a flow control orifice 119 through which high pressure pump discharge fluid must pass in its travel from passage 107 to annular channel 114. Passage 112 is connected to a device requiring fluid pressure for its operation and which may only intermittently utilize such fluid, for example, the control valve of a power steering system.

Flow control orifice 119 restricts the flow of fluid from passage 107 to channel 114 thereby providing a pressure drop across the orifice, the pressure in valve bore 108 on the downstream side of the orifice and that delivered to motor pressure supply channel 114 being lower than the pressure in passage 107 and valve bore 108 on the upstream side of orifice 119. A flow control valve 120 is positioned in valve bore 108 on the upstream side of orifice 119, the valve 120 having spaced lands 121 and 122 and an axially extending abutment 123 adapted to contact the end of land 110 to limit the axial movement of the valve to the right as viewed in FIGURE 1. A spring 124 yieldably biases valve 120 to its extreme right-hand position wherein abutment 123 seats on land 110 and land 121 blocks off pump discharge delivery passage 107 from an oil return passage 125 formed in housing 11 and connecting valve bore 108 to annular channel 72. A hollow chamber 126 in valve 120 is connected to the space between lands 121 and 122 and to oil return passage 125 by means of a drilled opening 127 through the valve body. A plug 128 is screw threaded into the hollow interior of valve 120 and is provided with a restriction 129. A plunger 130 and a ball valve 131 disposed in chamber 126 are spring biased by a spring 132 to control flow of fluid through restriction 129. A passage 133 having a restriction 134 therein connects the portion of valve bore 108 downstream from orifice 119 to a chamber 135 at one end of land 122, and containing spring 124.

It will be understood that the pump, which is driven at variable speeds depending upon engine speed, is a constant displacement pump and that the quantity of fluid discharged will vary depending upon changes in engine speed. The capacity of the pump is twice that of the motor. If all pump discharge fluid were delivered to the motor, motor speed would be approximately twice pump speed and would vary directly with changes in engine speed. Spring 124 and fluid pressure in chamber 135 normally bias valve 120 to the position shown wherein passage 125 is blocked off from passage 107. Fluid pressure from passage 107 acting on the end of valve 120 biases the valve to the left against spring 124 and the effect of fluid pressure in chamber 135 when the pressure acting on land 121 is of sufficient magnitude to do so. Such action will occur when the quantity of fluid displaced by the pump exceeds the predetermined system requirements, and will move the valve 120 to the left to connect discharge passage 107 to pump suction chamber 72 through passage 125. Due to the fact that annular chamber 72 extends entirely around the periphery of cam ring 29, this excess fluid is quickly and efficiently distributed by the pump intake arcuate grooves to the pump vanes. Restriction 134 in passage 133 serves as a dampening device to prevent rapid fluctuation of pressure in chamber 135 due to fluctuations of pressure in passage 133 to prevent undesirable "hunting" of valve 120. Pressure relief valve 131 carried by flow control valve 120 will open in the event that pressure in chamber 135 exceeds a predetermined amount to allow a small quantity of fluid to flow through restriction 129, chamber 126, and passages 127, 125 to chamber 72. Both restrictions 134 and 129 assist to prevent valve chatter of ball valve 131, restriction 134 serving to prevent rapid fluctuation in chamber 135 and restriction 129 serving to further prevent rapid fluctuation of pressure on the ball valve.

In the operation of the arrangement of FIGURES 1 through 4, at pump speeds below a predetermined speed, for example 750 r.p.m., by-pass valve 120 will be closed and all pump discharge will be delivered to the motor and to the passage 112 which is connected to a conventional power steering control system and which only calls for fluid pressure intermittently. Assuming that the pump capacity is twice the motor capacity, the motor will be driven at twice pump speed. In a second pump speed range, for example in the speed range between 750 r.p.m. and 1590 r.p.m., the control valve will increasingly open to discharge an increased quantity of fluid to pump suction to thereby decrease the motor speed with respect to pump speed as the pump speed increases. In a third pump speed range, for example at pump speeds above 1590 r.p.m., the flow control valve 120 will be fully open and the motor speed will be a function of the flow control orifice area which causes a pressure drop in pressure supplied to the motor and the area of the flow by-pass passage 125. The motor speed will increase with pump speed but at a different rate than that obtained prior to the time that valve 120 is fully opened. It will be understood that at pump speeds above 750 r.p.m. and below 1590 r.p.m., flow control valve 120 automatically compensates for intermittent demand for fluid by the power steering gear through passage 112. Any increase in flow of fluid through passage 112 will result in faster fluid flow through orifice 119 with a drop in pressure acting on the end of land 121 such that spring 124 and pressure in chamber 135 will move valve 120 to the right to decrease pump discharge by-pass. Due to the restriction 134, intermittent drop in pressure in passage 133 will not result in an immediate drop in pressure in chamber 135. Flow control valve 120 automatically compensates for flow to passage 112; an increase of flow in passage 112 decreases the flow control valve by-pass whereas a decrease of flow in passage 112 will increase the flow control valve by-pass.

It will be noted that the arrangement provides a very compact variable speed drive structure wherein a single pump is utilized both as a source of pressure for pressure utilizing devices such as power steering and to drive an accessory drive motor. The assembly is of very compact structure and except for the delivery passage and fluid return passage to the power steering unit is self-contained. All of the passages from the pump to the motor and the valve and passages connected thereto are internal within the housing. All external oil seals are connected to pump suction. These features all contribute to the provision of a variable speed accessory drive of leak-proof construction and long useful life with a minimum of service. The provision of the pump and motor rotor alignment sleeves and the manner in which the dowel pins maintain the end thrust plates, the pump and motor cam rings and the separator plate in proper alignment in the housing and with respect to the pump and motor rotors contribute to quiet operation which is important in automotive use. Pump discharge pressure in chamber 52 and spring 50 bias presser plate 45 and the entire pump and motor assembly to the left, as viewed in FIGURES 1 and 3, against thrust plate 31 to prevent internal leakage in the pump and motor, thereby contributing to efficient operation.

Referring to FIGURES 5 through 9, a modified accessory drive arrangement is shown. A cylindrical housing 140 may be mounted in a vehicle in any suitable position by means of a mounting bracket 141 fixed to an end wall 142 of housing 140 by means of bolts 143. A power input pulley 144 is bolted to a hub member 145 by means of bolts 146, the hub 145 being splined to a power input shaft 147 for rotation therewith as a unit. A bushing 148 rotatably supports shaft 147 in end wall 142, the bushing having an upstanding flange 149 thereon cooperating with the inner surface of end wall 142 to retain the bushing in the assembly. An upstanding flange 150 on shaft 147 cooperates with lip 149 to retain shaft 147 in the assembly. An oil seal 151 is disposed between hub 145 and an axial extension 142a on end wall 142.

Within housing 140 there is disposed a thrust plate 152, a pump rotor 153 and a pump cam ring 157. Referring to FIGURE 7, pump rotor 153 has formed therein twelve equally spaced vane slots 154, each slot having a vane 155 therein extending outwardly into contact with a cam surface 156 of pump cam ring 157. Pump rotor 153 is splined to power input shaft 147 for rotation therewith as a unit. Adjacent the pump unit is a separator plate 158 which separates the pump from a motor and provides hydraulic fluid passages between the pump and motor. The motor includes a motor rotor hub 159 provided with twelve equally spaced vane slots 159a best shown in FIGURE 8, each slot having a motor vane 159b extending outwardly into contact with a cam surface 162 of a motor cam ring 161. At the opposite side of the motor assembly from separator plate 158 is a presser plate 175. It will be noted that both the pump rotor 153 and motor rotor 159 are rotatably supported by means of power input shaft 147 to prevent any wobble of the rotors. Thrust plate 152, pump cam ring 157, separator plate 158, motor cam ring 161 and presser plate 175 are each held against rotation by dowel pins 164 terminating in end wall 142. Motor rotor 159 is splined to a power delivery shaft 160 for driving the shaft. A sleeve 160a is disposed between power input shaft 147 and power delivery shaft 160 for distributing oil for lubrication purposes. A power delivery pulley 165 is bolted to a support hub 165a by bolts 162, there being a bushing 163 disposed between power input shaft 147 and support hub 165a and an oil seal 164 disposed between the external surface of hub 165a opposite bushing 163 and hub 145 of power input pulley 144. Pulley 165 is splined to shaft 160 for rotation therewith and carries a cover 166 to prevent oil leakage through the pulley. Pulley 165 is retained on shaft 147 by means of a washer 167 and snap ring 168 arranged to hold support hub 165a on shaft 147. A passage 169 in separator plate 158 and passages 170, 171 and 172 in power input shaft 147 permit oil which is at motor inlet pressure to be conducted between the external surface of sleeve 160a and the internal surface of shaft 147 to bushings 148 and 163 for lubrication purposes.

Presser plate 175 is formed of three diameter portions 176, 177 and 178, respectively. Large diameter section 176 contacts the inner surface of housing 140. An end cover 185 is provided with a large diameter portion 179, an intermediate diameter portion 180 and a small diameter portion 181. An O-ring retainer 182 holds cover 185 on housing 140, there being an oil seal 183 between the large diameter portion 179 and the inner surface of housing 140. A spring 184 seated upon cover 185 and acting upon presser plate 175 biases the entire assembly including the motor, separator plate and pump against reaction plate 152 to prevent internal leakage in the pump and motor.

Presser plate 175 is drilled axially to provide an axially extending bore 190 in which is disposed a pulley speed ratio control valve 191 and a power steering compensating valve 205. Valve 191 includes spaced lands 192, 193 and is spring biased by a spring 194 to its extreme right-hand position shown against a stop pin 195. A central axial passage 196 in valve 191 is hydraulically connected to the space between lands 192 and 193 by a transverse passage 197 drilled in the valve. A plug 198 having a hollow bore 199 is screw-threaded into valve 191 and forms a valve seat for a pressure relief ball valve 200, the ball valve being biased into engagement with plug 198 by means of a plunger 201 acted upon by a spring 202. Disposed in axial alignment with pulley speed ratio control valve 191 is a compensator valve 205 having a constant area orifice 207 drilled through one end 206 of the valve. The external surface of compensator valve 205 has an annular groove 208 formed thereon cooperating with a fluid discharge passage 209 for purposes hereafter more particularly explained. A spring seat 210 carried by reduced diameter valve housing 178 has a central opening 211 therethrough and a spring 212 heated upon spring seat 210 biases valve 205 to its extreme lefthand position shown in FIGURE 5 where the valve contacts stop pin 195.

*Fluid Flow*

Figure 9:
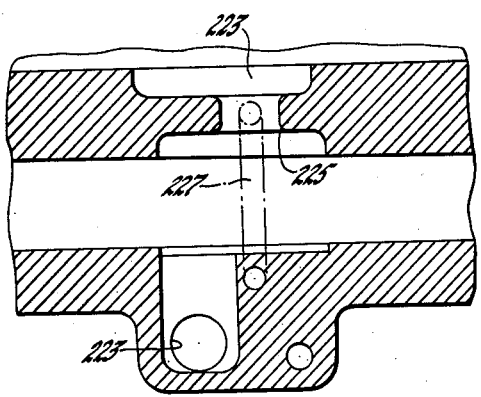
FIGURE 9 is a sectional view taken along the line 9—9 of FIGURE 5.

An opening 215 shown in FIGURES 5 and 7 is adapted to be connected to a fluid return passage (not shown) from a power steering valve (not shown) to admit fluid from a power steering unit to an annular channel 216 extending around the external periphery of pump cam ring 157. As best shown in FIGURE 6, suction fluid is conducted from 216 to the pump vanes 155 through arcuate shaped channels 217, 218 formed in thust plate 152 at one side of the pump and through arcuate shaped channels 219, 220 formed in spacer plate 158 at the opposite side of the pump. Pump fluid is discharged into arcuate shaped channels 221, 222 (see FIGURE 7) formed in separator plate 158 into axially extending passages 223, 224 in plate 158, best shown in FIGURE 5. A pair of similar fluid restrictions or pulley speed ratio control orifices 225 and 226 are disposed in passages 223 and 224, respectively. The pressure supplied to the motor on the downstream side of orifices 225 and 226 will be lower than pump discharge pressure on the upstream side of the orifices. Referring momentarily to FIGURE 9, a passage 227 is connected to the maximum velocity, minimum pressure throat of the flow control orifice 225, the passage 227 extending through separator plate 158 and motor cam ring 161 and then inwardly radially through the large diameter section 176 of presser plate 175 to a chamber 186 containing spring 194 of flow control valve 191. The pressure in passage 227 and chamber 186 will be lower than that delivered to the motor by means of passages 223 and 224. Fluid pressure discharge from the downstream side of orifice 225 is conducted through passage 223 to an annular recess 229 in presser plate 175 and extending around the external surface of land 193 of flow control valve 191. In a similar manner, fluid pressure from the downstream side of flow control orifice 226 is conducted to a recess 229 through an extension of passage 224, best shown in FIGURE 5. Pump discharge fluid from the upstream side of orifice 226 is conducted to a chamber 231 containing spring 194 by means of a branch passage 230 extending through separator plate 158, cam ring 161 and presser plate 175. It will be apparent that the pressure supplied to chamber 186 through passage 227 is lower than that supplied to annular channel 229 through passage 223 and that the pressure supplied to chamber 231 through passage 230 is greater than that in chamber 186 and in channel 229. Fluid pressure from chamber 231 is admitted through a fixed area orifice 207 in compensator valve 205 to the chamber 232 containing spring 212 from where the fluid flows to a discharge opening 233 through opening 211, the opening 233 being adapted to be connected to a device utilizing fluid pressure such as a control valve (not shown) for a power steering unit.

Fluid under pressure from passage 223 is conducted through a passage 235 to the space beneath the motor vanes 159b, the passage 235 extending through spacer 158 to admit fluid under pressure to the space beneath pump vanes 155. Pressure from passage 235 is further conducted through passages 169 and 170 and along the sleeve 160a to passages 171 and 172 for lubrication purposes. An additional passage 236 connected to passage 224 admits fluid under pressure to the space beneath motor vanes 159b and pump vanes 155, respectively.

Referring particularly to FIGURE 6, a chamber 240 between cover 185 and the large diameter section 176 of presser plate 175 is continuously connected to pump suction or intake by means of a passage 241 extending through presser plate section 176 and through separator plate 158 to the pump intake passage 219. A second passage 242 formed in presser plate section 176 and extending through separator plate 158 connects chamber 240 to pump suction passage 220. Additional passages 243 and 244 formed in presser plate section 176 and separator plate 158, respectively, connect the space beneath the pump and motor vanes to chamber 240. The space between sleeve 160a and power delivery shaft 160 is likewise connected to chamber 240 through a passage 245 between the end of shaft 160 and motor rotor hub 159 and presser plate 175. A passage 246 extending through end plate 142 of housing 140 and through thrust plate 152 returns oil from seals 164 and 151 to pump suction. It will be apparent that all of the external oil seals 164, 151 and 183 are connected to pump suction to prevent pressure build-up in the seals and oil leakage.

Referring again to FIGURE 6, chamber 231 is connected to a passage 247 formed in valve housing 178, the passage 247 being disposed directly opposite passage 209. Passage 209 is hydraulically connected to chamber 240 by means of a passage 248 formed in housing 178. It will be apparent that groove 208 in compensator valve 205 provides for restricted fluid flow from chamber 231 through passage 247, groove 208, passage 209 and passage 248 to chamber 240 when the compensator valve 205 is in its extreme left-hand position illustrated, since groove 208 is out of complete registry with passages 247 and 209. Full pump discharge pressure from chamber 231 acts on the end of valve 205 tending to move the valve against the action of spring 212 and pressure in chamber 232 to further restrict fluid flow from chamber 231 to suction or low pressure chamber 240. In the event that fluid pressure is utilized by the power steering mechanism there will be a drop in pressure in chamber 232 due to the action of fixed orifice 207. The valve 205 will thereupon move to the right against spring 212 and pressure in chamber 232 to further restrict flow of fluid from chamber 231 to chamber 240. Compensator valve 205 is thereby able to vary the pump fluid discharge to pump suction in accordance with variation of pump pressure in chamber 231 and acting on the end 206 of the valve and pressure in chamber 232 which varies in accordance with pressure at the power steering valve, and delivered through connection 233.

In the operation of the arrangement of FIGURES 5 through 9, the pump capacity or fluid circuit capacity may be considered to consist of two parts. One part may comprise the quantity of fluid required to the speed changing mechanism including the motor and flow control valve and the other to provide a variable quantity of fluid to the control valve of the power steering unit. In the embodiment in FIGURES 1 through 4, no compensating valve is provided to compensate for the effect of fluid usage by the power steering mechanism at pump speeds below 750 r.p.m At speeds above 750 r.p.m. pump speed, the flow control valve automatically compensates for fluid flow to the steering gear, an increase in steering fluid flow decreases the flow control valve by-pass and a decrease in steering fluid flow will increase flow control valve by-pass. In the arrangement of FIGURES 5 through 9 the compensator valve compensates for variation of fluid flow to the power steering gear at pump speeds below 750 r.p.m. Fluid taken off at the maximum velocity, minimum pressure throat area of the flow control orifice is utilized on one side of the spring loaded control valve and assists the flow control valve spring to oppose the effect pump line discharge pressure taken from the upstream side of the flow control orifice to control the position of the flow control valve. In this manner the flow control valve is acted upon by pressures of maximum differential pressure. In FIGURE 5, as the differential pressure between maximum pump discharge pressure in chamber 231 and acting on the end of flow control valve 191 and the minimum pressure in chamber 186 increase, valve 191 will move against spring 194 to connect the intermediate pressure in passage 22 to chamber 240. In the pump speed range below 750 r.p.m. valve 191 will close off passage 223 from chamber 240 to prevent by-pass of fluid. In the pump speed range between 750 and 1590 r.p.m the valve 191 will increasingly by-pass fluid from passage 223 to chamber 240, and will compensate for variation of fluid flow through the power steering unit. In the speed range above 1590 r.p.m., valve 191 will be fully open. At speeds below 750 r.p.m., compensator valve 205 will compensate for variation of fluid flow through the power steering, by providing a variable by-pass to chamber 240. With no power steering flow the limited by-pass of pump output pressure from chamber 231 to chamber 240 will be maximum. With increase in flow of fluid to the power steering and consequent drop of pressure in chamber 232, compensator valve 205 will move against spring 212 to increasingly reduce the by-pass of fluid from chamber 231 to chamber 240. Valve 205 is effective at pump speeds below 750 r.p.m. when the flow control valve 191 is ineffective and may also be effective at speeds above 750 r.p.m. pump speed. With increase in fluid flow to the steering gear, the compensating valve tends to diminish the effective by-pass flow area between groove passage 208 and by-pass passage 209. When there is no demand for steering fluid, the effective by-pass area of the compensating valve and the by-passed fluid is at a maximum.

Figure 10:
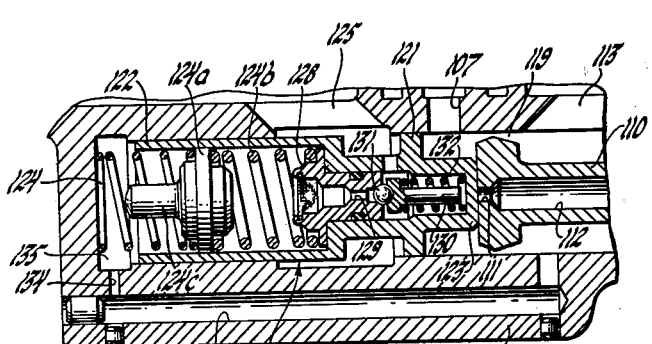
FIGURE 10 is a partially longitudinally sectional view of a modified flow control valve adapted to be substituted for the flow control valve shown in FIGURE 1.

FIGURE 10 illustrates a modified flow control valve adapted to be substituted for the flow control valve arrangement of FIGURE 1. In FIGURE 10, parts similar to those in FIGURE 1 are given the same number as in FIGURE 1. The arrangement of FIGURE 10 is the same as that of FIGURE 1 except for the addition of an axially movable plunger 124a and a spring 124b disposed between plunger 124a and plug 128, and the additional length of land 122. In the arrangement of FIGURE 10, the land 122 is extended as shown to permit a total predetermined travel of valve 120, for example .328 inch, from its extreme right-hand position shown wherein member 123 contacts land 110 to its extreme left-hand position wherein land 122 contacts the end wall of the housing and maximum by-pass of fluid from pump discharge passage 107 to pump suction return passage 125 is obtained. In moving to the left from the position shown to a position wherein land 121 inititally cracks passage 125 to permit initital restricted by-pass of fluid to passage 125, the valve moves a distance of .218 inch. During this action and during the movement of the valve, an additional .010 inch to the left wherein by-pass of fluid occurs, the valve is affected by both the relatively light spring 124 and the relatively heavy spring 124b. At the time the valve has moved a total distance of .228 inch to the left from its fully closed position shown and has uncovered by-pass passage 125 .010 inch, stem 124c will contact the end of housing 11. Valve 120 may thereafter move an additional .110 inch against the action of heavy spring 124b only.

Figure 11:
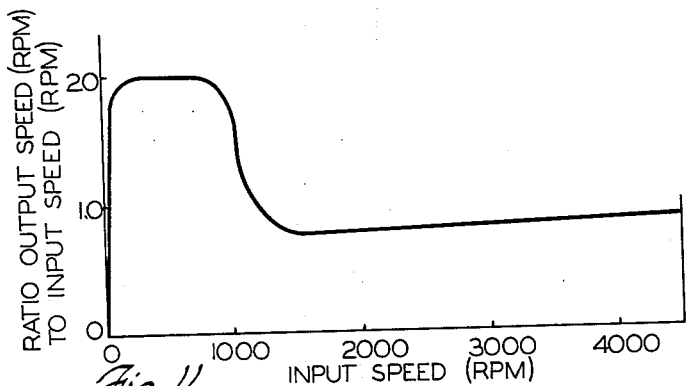
FIGURE 11 is a graph illustrating the ratio of motor output speed to pump input speed for various input pump speeds.

In FIGURE 11 there is shown a graph representing a curve of output to input speed ratio (r.p.m.) versus input speed (r.p.m.) indicating the performance characteristic of an accessory drive speed changer as shown in FIGURES 1 through 5, but utilizing a flow control valve of FIGURE 10. As indicated in FIGURE 11, up to 750 r.p.m. pump input speed the effective flow control valve by-pass area is zero and the motor speed is primarily a function of pump speed, the pump to motor volume ratio, the flow control valve area and the flow control orifice area. At 750 r.p.m. the flow control valve starts pump by-pass, and at 1590 r.p.m. pump input speed the flow control valve has moved to its extreme left-hand position representing the maximum by-pass area. Between 750 and 1590 r.p.m. speed range of the pump, the motor speed is a function of pump speed, pump to motor volume ratio, flow control orifice area, the flow control valve area, the spring rate and the flow control valve by-pass area. Above 1590 r.p.m pump speed, the motor speed is a function of the pump speed, pump to motor volume ratio, the flow control orifice area, and the combined pump-flow control valve by-pass-motor, orifice system. The pump inlet substantially matches the motor outlet and the pump outlet substantially matches the motor inlet. This permits motor outlet fluid, partly, to return by way of the pump-motor spacer to the pump inlet in the shortest possible path of travel for efficient operation.

In FIGURE 11 it will be apparent that at pump speeds up to 750 r.p.m., the initial travel of the flow control valve does not provide for by-pass of pump fluid and that the ratio of motor output speed to motor input speed is substantially constant. In the speed range between 750 and 1590 r.p.m. pump speed the flow control valve is increasly effective to by-pass fluid so that the ratio of output motor speed to motor input speed drops off rapidly. At speeds up to 750 r.p.m. pump speed with a pump to motor volume ratio of 2 to 1, the motor output speed will be twice pump speed. At 1590 r.p.m. pump input speed the ratio of motor output speed to pump input speed is .75. The ratio of motor speed therefore decreases rapidly from a maximum of twice pump speed at 750 r.p.m. pump speed to a minimum of ¾ pump speed at a pump speed of 1590 r.p.m. With a further increase in pump speed above 1590 r.p.m. the ratio of motor output speed to pump input speed increases slowly as a straight line function of pump input speed to a maximum of 80% at a pump speed of 3500 r.p.m.

Figure 12:
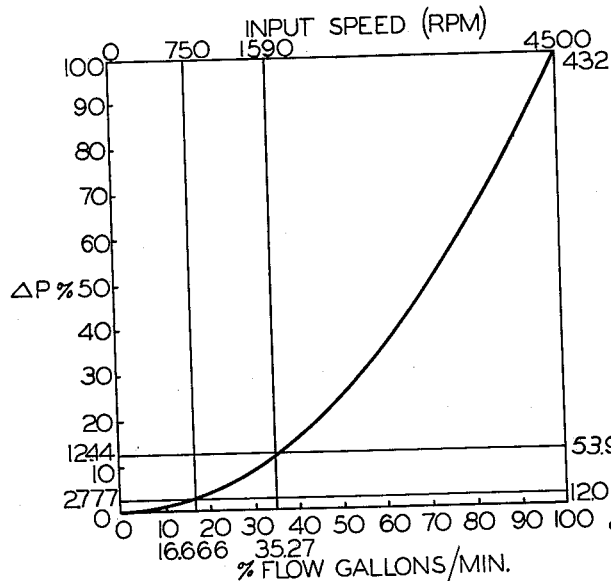
FIGURE 12 is a graph illustrating the differential pressure due to flow through the flow control orifice at pump outlet for various pump speeds of rotation.

In FIGURE 12 there is shown a curve of pressure drop across the flow control orifice 119 of a flow control valve arrangement of FIGURE 10 illustrating the pressure drop changes occurring from changes of pump input speed. As shown, in the pump speed range from 750 to 1590 r.p.m. during which the flow control by-pass valve is increasingly effective to by-pass fluid with increase in pump speed, the pressure drop across the flow control orifice is relatively small, increasing from 12 pounds per square inch at 750 r.p.m. pump speed to approximately 54 pounds per square inch at 1590 r.p.m pump speed. However, after the by-pass valve has fully opened at 1590 r.p.m. pump speed, the pressure drop across flow control orifice 119 rises rapidly to a maximum of 432 pounds per square inch at 4500 r.p.m. pump input speed.

Figure 13:
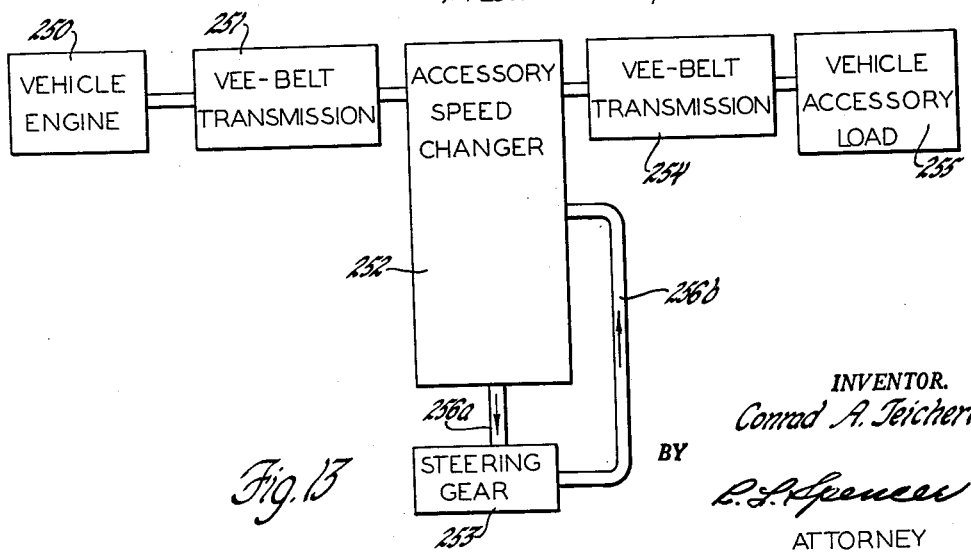
FIGURE 13 is a schematic diagram in block form illustrating the drive of the variable speed accessory drive by the engine, drive of accessories, and supply of fluid to and return of fluid from a power steering gear unit.

In FIGURE 13 there is shown a schematic diagram in block form of the hydraulic pump-motor accessory drive. As shown, power is transmitted from a vehicle engine 250 through a V-belt transmission 251 to drive the accessory speed changer 252 and to supply fluid to the control mechanism of a power steering gear 253. The accessory speed changer drives a vehicle accessory load 255 through a V-belt transmission 254. From the prior description it will be apparent that the vehicle accessories will be driven at twice engine speed and will change directly with changes in engine speed up to an engine speed of 750 r.p.m. In the engine speed range of 750 to 1590 r.p.m. the accessory speeds will decrease rapidly relative to engine speed, becoming 75% engine speed at 1590 r.p.m. At engine speeds above 1590 r.p.m. the accessory speed will increase slowly relative to engine speed, becoming 85% of engine speed at 4500 r.p.m. engine speed.

The heretofore described variable speed accessory drive provides for automatic control of accessory speeds and supply of fluid pressure for power steering mechanism through the use of a single pump for driving the accessories through a hydraulic motor and for supply of pressure to the power steering gear. The flow control valve, flow orifice arrangement automatically controls the motor and accessory speeds for maximum economy of operation with minimum wear and noise, and at the same time insures that the accessories will be driven at sufficient speed at low engine speeds to have adequate capacity at such low engine speeds. The entire assembly is particularly designed for quiet efficient operation and for long life with little servicing. The assembly is compact in size, and comprises a self-contained assembly of pump and motor and control valving in a common housing and provides a compact unit easily installed in an automotive vehicle. The accessories driven by the unit may include the generator, air conditioning compressor, air compressor for the vehicle air suspension system, or any other automotive vehicle engine driven accessories such as the engine fan. In the event that the drive unit is to be used solely for driving engine accessories and need not also supply fluid to an auxiliary device such as a power steering unit, the external pressure fluid delivery passages and fluid return passages in the housing may be plugged off by suitable plugs. It will be understood that the pump is belt driven from the vehicle engine and the accessories are belt driven from the motor power delivery shaft. 256a and 256b in FIGURE 13 schematically represent fluid passages connecting pump discharge fluid to a power steering unit and for returning fluid from the power steering unit to pump suction.

What is claimed is:

1. An accessory drive unit for driving the accessories of an engine driven vehicle comprising a housing, a vane type pump and a vane type motor disposed in said housing, said pump including a vane rotor having vanes therein and a pump cam ring contacted by said vanes, an end wall on said housing, said motor including a motor rotor having vanes therein and a motor cam ring contacting said motor vanes, a thrust plate disposed between said end wall and said pump, a separator plate disposed between said pump and motor, a presser plate adjacent said motor, means for biasing said presser plate, motor, separator plate, pump and thrust plate in a direction toward said end wall, a common element for anchoring said presser plate, motor cam ring, separator plate, pump cam ring and thrust plate to said end wall, an engine driven power input shaft for driving said pump rotor, a power delivery shaft driven by said motor rotor and connected to drive said accessories, passage means for conducting fluid discharge by said pump to said motor for driving said motor, and passage means for returning fluid discharged by said motor to the suction side of said pump.

2. An accessory drive system for driving the accessories of an engine driven vehicle comprising a housing, a vane type pump and a vane type hydraulic motor disposed in said housing, said pump including a vane rotor having vanes therein and a pump cam ring contacted by said vanes, said motor including a motor having vanes therein and a motor cam ring contacted by said motor vanes, an end wall on said housing, a thrust plate disposed between said end wall and said pump, a separator plate disposed between said pump and said motor, a presser plate adjacent said motor at the side of said motor opposite said separator plate, common means for anchoring said presser plate, motor cam ring, separator plate, pump cam ring and thrust plate to said housing end wall and for permitting movement thereof toward said end wall, means for biasing said presser plate toward said end wall, an engine driven power input shaft for driving said pump rotor, a power delivery shaft driven by said motor rotor and connected to drive said accessories, means for supporting said pump rotor comprising a support sleeve fixed to said end wall and contacting said pump rotor, means for supporting said motor rotor comprising a sleeve supported in said presser plate and contacting said motor rotor, passages for conducting fluid discharged by said pump to said motor for driving said motor, and passages for returning fluid discharged by said motor to the suction side of said pump.

3. An accessory drive unit for driving the accessories of an engine driven vehicle comprising a housing, an engine driven pump and a fluid motor disposed in said housing, a power delivery shaft driven by said motor for driving said accessories, passage means within the interior of said housing for delivering pump discharge fluid to said motor to drive the same, means including a flow control orifice and a by-pass valve within said housing and between said pump and motor for controlling motor speed, said motor speed control means being effective in a first predetermined speed range of said pump to direct full pump discharge fluid flow to said motor to increase motor speed directly with increase in pump speed, said motor speed control means being responsive in a second predetermined speed range of said pump to rise of pressure on the upstream side of said orifice to by-pass pump discharge fluid to said pump to thereby decrease motor speed relative to increase in pump speed, and additional passage means within the interior of said housing for returning fluid from said motor to pump suction.

4. An accessory drive system for driving the accessories of an engine driven vehicle comprising a housing, an engine driven pump and a motor disposed in said housing, means for connecting said motor to said accessories, a suction chamber associated with said pump, a pressure discharge passage in said housing for delivering fluid under pressure from said pump to said motor, a by-pass passage in said housing for connecting said pump suction chamber to said pump pressure discharge passage, means for controlling the speed of said motor including a flow control orifice and a flow control valve disposed in said pump pressure discharge passage, said motor being connected to said pump pressure discharge passage on the downstream side of said flow control orifice, said flow control valve being disposed in said pump pressure discharge passage on the upstream side of said orifice and movable in response to pump discharge pressure to control the rate of fluid flow through said by-pass passage, and additional passages between said pump and motor for returning fluid from said motor to said pump.

5. An accessory drive unit for driving the accessories of an engine driven vehicle comprising a housing, an engine driven pump and a motor disposed in said housing, means for connecting said motor to said accessories, a suction chamber associated with said pump, a pressure discharge passage in said housing hydraulically connecting the discharge of said pump to said motor, a by-pass passage in said housing for hydraulically connecting said pump discharge passage to said pump suction chamber, motor speed control means including a flow control orifice and a by-pass valve disposed in said pump discharge passage between said pump and said motor, said flow control orifice being effective to reduce the pressure of fluid delivered to said motor by said pump, said by-pass valve being responsive to full pump discharge pressure to increase the rate of flow of fluid through said by-pass passage in response to increase in pump pressure, spring means yieldably biasing said by-pass valve to restrict the flow of fluid through said by-pass passage, a chamber associated with said by-pass valve and hydraulically connected to pressure as reduced by said orifice for assisting said spring means, and additional passages for returning fluid from said motor to said pump.

6. An accessory drive unit for driving the accessories of an engine driven vehicle comprising a housing, an engine driven pump and a motor disposed in said housing, means for connecting said motor to said accessories, a suction chamber associated with said pump, a pressure discharge passage in said housing hydraulically connecting the discharge of said pump to said motor, a by-pass passage in said housing for hydraulically connecting said pump discharge passage to said pump suction chamber, means for controlling motor speed including a flow control orifice for reducing the pressure of fluid supplied to said motor and a by-pass valve responsive to full pump discharge pressure for controlling the by-pass of fluid to said by-pass passage, spring means operative upon said by-pass valve for opposing the movement of said valve by pump discharge pressure, a chamber associated with said by-pass valve and hydraulically connected to fluid pressure as reduced by said flow control orifice for assisting the action of said spring means, a pressure relief valve carried by said by-pass valve, means including a spring normally closing said pressure relief valve, said pressure relief valve being movable in response to a predetermined pressure in said last-mentioned chamber to connect said last-mentioned chamber to said by-pass passage, and additional passages for returning fluid from said motor to said pump.

7. An accessory drive unit for driving the accessories of an engine driven vehicle comprising a housing, an engine driven pump and a motor disposed in said housing, means for connecting said motor to said accessories, a suction chamber associated with said pump, a pressure discharge passage in said housing for delivering fluid under pressure from said pump to said motor, a by-pass passage in said housing for hydraulically connecting said pump suction chamber to said pump pressure discharge passage, means for controlling the speed of said motor including a flow control orifice disposed in said pump pressure discharge passage between said pump and said motor and a by-pass valve, said by-pass valve being disposed in said pump discharge on the upstream side of said flow control orifice, said flow control orifice being effective to reduce the pressure delivered to said motor to a lower pressure than that on the upstream side of said flow control orifice, said valve being movable in response to variation of pressure in said pump discharge passage on the upstream side of said flow control orifice to vary the rate of fluid by-pass to said by-pass passage, spring means yieldably biasing said by-pass valve to block off flow through said by-pass passage, and a chamber associated with said by-pass valve and connected to the pressure as reduced by said flow control orifice, the reduced pressure in said last-mentioned chamber assisting said spring means to position said valve to block off fluid flow through said by-pass passage, and additional means for returning fluid from said motor to said pump.

8. An accessory drive unit for driving the accessories of an engine driven vehicle comprising a housing, a pump and a motor disposed in said housing, a power input shaft adapted to be driven by said engine connected to drive said pump and extending from one end of said housing, a power delivery shaft driven by said motor and extending from said one end of said housing, a thrust plate in said housing at one side of said pump, a separator plate in said housing disposed between said pump and said motor, a presser plate disposed in said housing at the side of said motor opposite said separator plate, means biasing said presser plate against said motor; said motor, separator plate and pump being movable axially in response to said biasing means to prevent internal leakage in said pump between said thrust plate and said separator plate and said pump and to prevent internal leakage between said separator plate and said presser plate and said motor, a suction chamber associated with said pump, a pump pressure discharge passage in said separator plate, a pump pressure delivery passage in said housing for delivering fluid from said pump pressure discharge passage to said motor, a by-pass passage in said housing for by-passing pump discharge pressure to said pump suction chamber, and motor speed control means including a flow control orifice disposed in said pump pressure delivery passage between said pump and motor and a by-pass flow control valve, means biasing said by-pass valve to block off said by-pass passage, said flow control valve being movable in response to rise of pump discharge pressure to connect the fluid discharged by said pump to said by-pass passage, and additional passages including passages through said separator plate for returning fluid from said motor to said pump.

9. An accessory drive unit for driving the accessories of an engine driven vehicle comprising a housing, a pump and a rotor disposed in said housing, a thrust plate at one side of said motor, a separator plate disposed between said pump and said motor, a presser plate at the opposite side of said motor from said separator plate, said pump including a rotor having a plurality of vanes therein and contacting a cam ring, said motor including a rotor having a plurality of vanes therein and contacting a motor cam ring, an engine driven power input shaft for driving said pump rotor, a pump rotor alignment sleeve extending into said pump rotor for supporting said rotor, a power delivery shaft driven by said motor and adapted to be connected to said engine accessories for driving the same, a motor rotor alignment sleeve extending into said motor rotor for supporting the same, dowel pin means extending through said thrust plate, said pump cam ring, said separator plate, said motor cam ring and into said presser plate for preventing rotation thereof and for permitting limited axial motion thereof, means biasing said presser plate against said motor to prevent internal fluid leakage between said separator plate and said motor and between said presser plate and said motor, said separator plate being axially movable against said pump to prevent internal fluid leakage between said thrust plate and said motor and between said separator plate and said motor, a pump pressure discharge passage for delivering pressure fluid to said motor, a pump suction chamber, a by-pass passage adapted to return pump discharge fluid to said pump suction chamber, means for controlling the speed of said motor including a flow control orifice and a by-pass valve, means biasing said by-pass valve to prevent flow of fluid through said by-pass passage, said by-pass valve being movable in response to rise in pressure in said pump discharge passage to permit flow of pump discharge pressure to said by-pass passage, and additional passages for returning fluid from said motor to said pump.

10. An accessory drive unit for driving the accessories of an engine driven vehicle comprising a housing, a pump and a motor disposed in said housing, said housing forming a cylindrical chamber having an end wall, a thrust plate between said motor and end wall, a separator plate disposed between said pump and motor, a presser plate at the side of said motor opposite said separator plate, said pump including a rotor for driving a plurality of vanes and a cam ring cooperating with said vanes, said motor including a rotor carrying a plurality of vanes and a cam ring cooperating with said vanes, an engine driven power input shaft for driving said pump rotor, a power delivery shaft adapted to be connected to said accessories for driving the same driven by said motor rotor, a pump rotor alignment sleeve supported in said end wall and extending into said pump rotor for supporting the same, a motor rotor alignment sleeve carried by said presser plate and extending into said motor rotor for supporting said rotor, a cover carried by said presser plate and forming a chamber between said presser plate and cover adapted to receive fluid under pressure, an end cover fixed to said housing and forming an end chamber, means continuously connecting said end chamber to pump suction, a spring in said end chamber seated on said end cover for biasing said presser plate into contact with said pump, common means for preventing rotation of said thrust plate, said pump cam ring, said separator plate, said motor cam ring and said presser plate and for permitting limited axial motion of the same, means for conducting full pump discharge pressure to said chamber between said presser plate and said first-mentioned cover, the pressure in said last-mentioned chamber assisting the action of said spring, means for providing fluid under pressure to power input and power delivery shafts for lubricating the same, oil seal means for preventing external oil leakage of said lubricating fluid, means connecting said seal means to pump suction for returning shaft lubricating fluid to said pump, a pump discharge passage for connecting said pump to said motor, a by-pass passage connecting said pump discharge passage to pump suction, means for controlling motor speed including a flow control orifice disposed in said pump discharge passage between said pump and motor and a by-pass valve disposed in said pump discharge passage between said flow control orifice and said by-pass passage, means yieldably biasing said by-pass valve to block off said by-pass passage, said by-pass valve being movable in response to rise in pump discharge pressure to control the flow of fluid through said by-pass passage, and additional passage means for returning fluid from said motor to said pump.

11. An accessory drive unit for driving the accessories of an engine driven vehicle and for supplying fluid under pressure to an auxiliary device comprising a housing, an engine driven pump and a hydraulic motor driven by said pump disposed in said housing, a power delivery shaft driven by said motor and connected to drive said accessories, a pump pressure delivery passage in said housing connecting said pump to said motor, a by-pass passage in said housing connecting said pump pressure delivery passage to pump suction, means for controlling the speed of said motor including a flow control orifice and a flow control valve, means yieldably biasing said flow control valve to block off said by-pass passage, said flow control valve being responsive to rise in pump discharge pressure to regulate flow of fluid through said by-pass passage, external connections on said housing for delivering pressure to said auxiliary device and for returning fluid from said auxiliary device to pump suction, and additional internal passages for returning fluid from said motor to pump suction.

12. An accessory drive unit for driving the accessories of an engine driven vehicle comprising a housing, an engine driven pump and a hydraulic motor disposed in said housing, a power delivery shaft driven by said motor for driving said accessories, a pump discharge passage for delivering fluid to said motor to drive the same, means for controlling the speed of said motor including a flow control orifice disposed in said pump discharge passage and a by-pass flow control valve, a by-pass passage controlled by said valve for returning pump discharge fluid to pump suction, means biasing said valve to block off said by-pass passage in a first range of speed of rotation of said pump, said valve being movable in response to rise of pump discharge pressure in a second speed range of said pump to regulate flow of fluid through said by-pass passage, said valve being movable in response to further rise of pump discharge pressure in a third speed range of said pump to fully open said by-pass passage, and an additional passage for returning fluid from said motor to said pump.

13. An accessory drive unit for driving the accessories of an engine driven vehicle and for supplying fluid under pressure to an auxiliary device comprising a housing, an engine driven pump and a hydraulic motor driven by said pump disposed in said housing, a power delivery shaft driven by said motor and connected to drive said accessories, a pump pressure delivery passage within said housing for delivering pump discharge fluid to said motor, means for controlling the speed of said motor including a flow control orifice disposed in said pump discharge passage and a by-pass valve, a by-pass passage adapted to by-pass pump discharge pressure to pump suction, means yieldably biasing said by-pass valve to prevent flow of fluid through said by-pass passage, said by-pass valve being movable in response to rise of pump pressure to increase the flow of fluid through said by-pass passage, a connection on said housing for delivering fluid under pressure to said auxiliary device, a connection on said housing for returning fluid from said auxiliary device to pump suction, a second by-pass passage for returning pump pressure to pump suction, a compensator valve responsive to flow of fluid to said auxiliary device for controlling flow of fluid through said second by-pass passage, and additional passages for returning fluid from said motor to said pump.

14. An accessory drive unit for driving the accessories of an engine driven vehicle and for supplying fluid under pressure to an auxiliary device comprising a housing, an engine driven pump and a hydraulic motor driven by said pump disposed in said housing, a power delivery shaft driven by said motor for driving said accessories, a pump pressure delivery passage in said housing for connecting pump discharge fluid to said motor to drive said motor, means for controlling motor speed including a flow control orifice disposed in said passage and a flow control valve, a by-pass passage for returning pump discharge to pump suction controlled by said flow control valve, means biasing said flow control valve to block off said by-pass passage, a chamber at one end of said flow control valve connected to pump discharge pressure, said flow control valve being movable in response to rise in pressure in said chamber to regulate flow of pump discharge fluid through said by-pass passage, a compensator valve having a fixed orifice therein permitting restricted fluid flow therethrough and an annular groove on the exterior surface of said valve, a second by-pass passage connected to pump suction, means biasing said compensator valve to permit restricted flow of pump pressure through said groove and said second by-pass passage, a fluid outlet in said housing connecting the interior of said compensator valve to said auxiliary device, said compensator valve being movable in response to fluid flow to said auxiliary device to block off fluid flow through said second by-pass, a fluid inlet in said housing for returning fluid from said auxiliary device to pump suction, and additional passages for returning fluid from said motor to pump suction.

15. An accessory drive unit for driving the accessories of an engine driven vehicle comprising a housing, an engine driven pump and a hydraulic motor disposed in said housing, a power delivery shaft driven by said motor for driving said accessories, a pump discharge passage for delivering fluid to said motor for driving the same, means for controlling the speed of said motor including a flow control orifice disposed in said pump discharge passage and a by-pass flow control valve, said flow control orifice being effective to reduce the pressure supplied to the motor to a value less than full pump discharge pressure, a by-pass passage controlled by said flow control valve, a spring yieldably biasing said flow control valve to block off said by-pass passage, a chamber adjacent said spring connected to fluid pressure as reduced by said flow control orifice, said reduced pressure and said spring being effective in a first range of speed of rotation of said pump to position said flow control valve to block off said by-pass passage, said flow control valve being movable in response to rise of full pump discharge pressure in a second speed range of pump rotation to regulate fluid flow through said by-pass passage, said valve being movable in response to further rise of full pump discharge pressure in a third speed range of pump rotation to fully open said by-pass passage, and additional passages for returning fluid from said motor to pump suction.

16. An accessory drive unit for driving the accessories of an engine driven vehicle and for supplying fluid under pressure to an auxiliary device comprising a housing, an engine driven pump and a hydraulic motor disposed in said housing, a power delivery shaft driven by said motor for driving said accessories, a pump discharge passage for delivering fluid to said motor to drive the same, means for controlling the speed of said motor including a flow control orifice disposed in said pump discharge passage and a by-pass flow control valve, a by-pass passage controlled by said valve for returning pump discharge fluid to pump suction, means biasing said valve to block off said by-pass passage in a first range of speed of rotation of said pump, said valve being movable in response to rise of pump discharge pressure in a second speed range of said pump for regulating flow of fluid through said by-pass passage, said valve being movable in response to further rise of pump discharge pressure in a third speed range of said pump to fully open said by-pass passage, a passage in said housing for delivering fluid under pressure to said auxiliary device, a compensator valve acted upon by pump discharge pressure and having a fixed orifice therein for passage of fluid to said auxiliary device, a second by-pass passage controlled by said compensator valve, means biasing said compensator valve to permit restricted flow of pump discharge fluid through said second by-pass passage, said compensator valve being movable in response to flow of fluid to said auxiliary device to increasingly restrict fluid flow through said second by-pass passage with increase in fluid flow to said auxiliary device, a fluid passage for returning fluid from said auxiliary device to pump suction, and an additional passage for returning motor discharge fluid to pump suction.

17. An accessory drive unit for driving the accessories of an engine driven vehicle comprising a housing forming a cylindrical chamber therein, a vane type pump and a vane type motor disposed in said chamber, said pump including a vane rotor having vanes therein and a pump cam ring contacted by said vanes, said motor including a motor rotor having vanes therein and a motor cam ring contacting said motor vanes, an end wall on said housing, a thrust plate disposed between said end wall and pump, a separator plate disposed between said pump and motor, a presser plate adjacent said motor at the side of said motor opposite said separator plate, a first cover forming with said presser plate a chamber adapted to receive pump discharge pressure, a second cover fixed to said housing and forming with said presser plate an additional chamber, seals carried by said presser plate for preventing leakage of high pressure fluid into said additional chamber, passage means permanently connecting said additional chamber to the suction side of said pump, passage means through said pressure plate for admitting pump discharge pressure to the chamber between said pressure plate and first cover for biasing said presser plate in a direction toward said thrust plate, additional means for biasing said presser plate in a direction toward said thrust plate comprising a spring seated upon said second cover, common means for connecting said presser plate, motor cam ring, separator plate pump cam ring and thrust plate to said housing end wall, passage means for admitting pump discharge pressure to said presser plate passage, passage means for conducting pump discharge pressure from said pump to said motor for driving said motor, additional passage means for returning fluid from said motor to said pump, an engine driven power input shaft for driving said pump rotor, and a power delivery shaft driven by said motor rotor and connected to drive said accessories.

18. An accessory drive unit for driving the accessories of an engine driven vehicle comprising a housing, a vane type pump and a vane type motor disposed in said housing, said pump including a vane rotor having vanes therein and a pump cam ring contacted by said pump vanes, an end wall at one end of said housing, a thrust plate between said end wall and said pump, an engine driven power input shaft extending into said housing for driving said pump rotor, means for supporting said thrust plate, said pump rotor and said power input shaft comprising a sleeve coaxial with said power input shaft, said sleeve being rigidly supported in said end wall and extending through said thrust plate and contacting said pump rotor, a separator plate in said housing between said pump and motor, a power delivery shaft connected to drive said accessories, said motor including a motor rotor having vanes therein and a motor cam ring for contacting said motor vanes, a presser plate adjacent said motor at the side of said motor opposite said separator plate, a first cover cooperating with said presser plate and forming therewith a chamber adapted to receive fluid under pressure, a series of dowel pins extending through said thrust plate, pump cam ring, separator plate, motor cam ring and presser plate for locking said members to said motor housing end wall and for permitting axial motion thereof with respect to said end wall, a second cover fixed to said housing, spring means seated on said second cover for biasing said presser plate in a direction toward said end wall, means for admitting pump discharge pressure to said chamber between said presser plate and first cover to assist the bias of said spring, means for connecting the space between said covers to the suction side of said pump, passages in said separator plate for conducting fluid discharged by said motor to the suction side of said pump, a pressure discharge passage in said housing for delivering fluid under pressure from said pump to said motor for driving said motor, and a passage in said separator plate for admitting fluid pressure discharged by said pump to said pressure discharge passage in said housing.

References Cited in the file of this patent
UNITED STATES PATENTS

| | | |
|---|---|---|
| 2,462,983 | MacDuff et al. | Mar. 1, 1949 |
| 2,737,196 | Eames | Mar. 6, 1956 |
| 2,799,996 | Van Meter | July 23, 1957 |
| 2,880,586 | Lincoln | Apr. 7, 1959 |
| 2,938,347 | Sturgis | May 31, 1960 |